United States Patent [19]
Nair et al.

[11] Patent Number: 5,753,426
[45] Date of Patent: May 19, 1998

[54] PHOTOGRAPHIC ELEMENTS CONTAINING A TRANSPARENT MAGNETIC RECORDING LAYER

[75] Inventors: Mridula Nair, Penfield; Robert Edward Dickerson, Hamlin; George Leslie Oltean, Rochester; Lloyd Anthony Lobo, Webster, all of N.Y.

[73] Assignee: Eastman Kodak Company, Rochester, N.Y.

[21] Appl. No.: 604,272

[22] Filed: Feb. 21, 1996

Related U.S. Application Data

[60] Provisional application No. 60/000,609, Jun. 30, 1995.
[51] Int. Cl.⁶ .................. G03C 1/76; G03C 1/81; G03C 1/85; G03C 11/06
[52] U.S. Cl. .................. 430/523; 430/140; 430/930; 430/496; 430/530; 430/539
[58] Field of Search .................. 430/140, 930, 430/496, 501, 523, 530, 539

[56] References Cited

U.S. PATENT DOCUMENTS

| | | | |
|---|---|---|---|
| 5,070,006 | 12/1991 | Krafft et al. | 430/531 |
| 5,147,768 | 9/1992 | Sakakibara | 430/501 |
| 5,334,494 | 8/1994 | Ueda et al. | 430/533 |
| 5,382,494 | 1/1995 | Kudo et al. | 430/140 |
| 5,457,012 | 10/1995 | Nair et al. | 430/495.1 |
| 5,520,954 | 5/1996 | Oltean et al. | 427/128 |
| 5,531,913 | 7/1996 | Nair et al. | 252/62.53 |
| 5,573,897 | 11/1996 | Andries et al. | 430/501 |
| 5,633,126 | 5/1997 | Dickerson et al. | 430/496 |

FOREIGN PATENT DOCUMENTS

| | | |
|---|---|---|
| 07077757 | 3/1993 | Japan . |

OTHER PUBLICATIONS

Karlheinz Keller, Science and Technology of Photography, pp. 118–119 1993.

*Primary Examiner*—Mark F. Huff
*Attorney, Agent, or Firm*—Anderson J. Anderson

[57] ABSTRACT

A photographic sheet element comprising a film support, at least one light-sensitive layer having a hydrophilic binder on a first side of the support, the thickness of the at least one light-sensitive layer and other layers on the first side of the support being $T_E$, on the opposite side of the support, a transparent magnetic recording layer comprising ferromagnetic particles in a hydrophilic colloid, the thickness of the transparent magnetic recording layer being $T_M$, intermediate, the transparent magnetic recording layer and the support, a hydrophilic colloid control layer, the thickness of the control layer being $T_C$, the relative thickness of the layers being represented by the formula:

$$\frac{T_C + T_M}{T_E} = X$$

where $0 < X < 10$.

17 Claims, No Drawings

PHOTOGRAPHIC ELEMENTS CONTAINING A TRANSPARENT MAGNETIC RECORDING LAYER

Reference is made to and priority claimed from U.S. Provisional application Ser. No. 60/000,609 filed, Jun. 30, 1995.

BACKGROUND OF THE INVENTION

FIELD OF THE INVENTION

This invention relates to a light sensitive photographic element and, particularly, to a light sensitive photographic element comprising a transparent hydrophilic colloid backing layer for curl control together with a transparent magnetic recording layer comprising ferromagnetic particles in a hydrophilic colloid and a process for preparing the same.

Medical imaging devices such as CAT scanners, magnetic resonance imagers (MRI) and ultrasound imagers obtain information and store it in digital form which can then be sent to a laser printer for imaging a hard copy of the information created in an exam. One type of laser printer uses a helium/neon laser to write the collected information onto a film that is spectrally sensitized to match the emission spectrum of the laser printer used. The laser print film becomes the permanent record of the information generated from the particular exam that was done.

The ability to magnetically encode a laser print film allows for even greater information and capability to benefit medical radiologists. Information that could be written (magnetically recorded) could be patient ID and other information, exposure conditions, and even interpretation of the diagnosis of the radiograph. Medical radiologists today dictate their findings on dictating machines which are then used to generate a report at a later date after a stenographer plays back the dictation. Often times the radiograph and the report become separated and the radiograph is sometimes lost which negates the value of the report. By having the diagnosis recorded directly on the film it would be impossible for the image and the diagnosis to be separated and the film could be replayed at any time to generate the diagnosis either through sound or digital representation.

Other potential applications of magnetically encoding laser print films is to provide information about the photographic response of the film as measured in manufacturing. Such information recorded on the film would allow a feedback loop to exposing devices and/or processors that could compensate for differences in sensitometry from batch to batch or even compensate for changes as a function of film aging. These corrections would significantly reduce the variability from day to day that might otherwise occur and result in more consistent results.

Similarly, it is desirable to store information other than images at the time of image-capture and printing, such as time and date and other photographing conditions, magnification/reduction ratio, processing conditions, messages, etc., on the back side of a (professional) color reversal sheet film.

SUMMARY OF THE INVENTION

The invention contemplates a photographic sheet element comprising a film support, at least one light-sensitive layer having a hydrophilic binder on a first side of the support, the thickness of the at least one light-sensitive layer and other layers on the first side of the support being $T_E$, on the opposite side of the support, a transparent magnetic recording layer comprising ferromagnetic particles in a hydrophilic colloid, the thickness of the transparent magnetic recording layer being $T_M$, intermediate, the transparent magnetic recording layer and the support, a hydrophilic colloid control layer, the thickness of the control layer being $T_C$, the relative thickness of the layers being represented by the formula:

$$\frac{T_C + T_M}{T_E} = X$$

where $0<X<10$. By "thickness" is meant the thickness derived from the hydrophilic colloid. Generally, thickness of a layer containing 1.076 g/m$^2$ (100 mg/ft$^2$) of a hydrophilic colloid, such as, gelatin, is approximately 1 micrometer thick. Thickness of the layers $T_C+T_M$ and $T_E$ are determined after equilibrating the film for 2 days at 25° C. and 55 percent relative humidity.

This invention also provides an imaging element having excellent magnetic characteristics and photographic transparency by virtue of the physical flatness, low granularity, and optical density of the element.

An additional advantage of this invention is to obtain a plurality of layers of uniform thickness on the back side of the support through simultaneous application of the respective solutions using conventional coating equipment (bead coating, curtain coating).

The transparent magnetic recording layer of this invention comprises a dispersion of magnetic particles, a dispersant preferably whose HLB number is greater than 8 and is selected from amphipathic water dispersible or soluble compounds, a film forming binder such as gelatin or other hydrophilic colloid and optionally a viscosifier of synthetic or naturally occurring materials as described in U.S. Pat. Nos. 5,457,012, 5,531,913, and 5,520,954, incorporated herein by reference.

A still further aspect of this invention comprises a photographic element comprising at least one light sensitive layer and on one side of a support a transparent magnetic recording layer on the other side prepared by adding a film-forming binder and optionally a viscosifier preferably a polyelectrolyte that is capable of interacting with the binder to a dispersion of magnetic particles in an aqueous medium containing a dispersant having an HLB number of at least 8 to form a coating composition and applying said coating composition and a curl control composition comprising gelatin or other hydrophilic colloid onto the backside of the photographic support.

Another aspect of this invention comprises a process for simultaneously applying a plurality of layers comprising a coating composition comprising a layer derived from a dispersion of magnetic particles in an aqueous medium, a curl control layer and other conventional gelatin containing layers onto the support. Preferably, a lubricating layer, the magnetic layer and the curl control layer are applied simultaneously.

Magnetic dispersions formulated in an aqueous medium containing a hydrophilic colloid such as gelatin are compatible with and can make it feasible to simultaneously coat the magnetic layer, the curl control and other conventional gelatin containing layers on the back side of the support.

Aqueous coatings of magnetic and associated layers means that the solvent recovery procedures that are presently employed in solvent coatings will not be needed. In addition to capital savings, the risk of fire and explosion is greatly reduced.

Aqueous coatings make it possible to use high speed high capacity coating machines capable of simultaneous multilayer coatings.

By using aqueous formulations containing colloids such as gelatin for the magnetic layer and the curl control layers, the risk of fogging and adverse sensitization are minimized compared to solvent based coating systems which might include photoactive crosslinkers. An additional advantage of aqueous formulations is that dyes are readily removable from the curl control layer during processing.

DETAILED DESCRIPTION OF THE INVENTION

This invention relates to transparent layers containing magnetic particles, the layers being capable of having coded information written and read therefrom. The transparent layers containing magnetic particles in accordance with this invention are particularly applicable for use in combination with photographic elements wherein information can be written into the magnetic layer without affecting the quality and performance of the light-sensitive photographic elements.

It is a feature of this invention that the photographic element comprises a support and at least one light sensitive layer having a hydrophilic binder on the first side of the support and on the opposite side of the support a hydrophilic colloid curl control layer, and a transparent magnetic recording layer comprising ferromagnetic particles in a hydrophilic colloid and optionally, a lubricating layer over the magnetic recording layer, where the thickness of these layers is in accordance with the relationship set forth above.

The structure of the photographic element in accordance with this invention is especially suitable for color reversal sheet film, laser print film, master for lithographic printing plates, and the like.

The magnetic layer may comprise, for example, fine ferromagnetic powders such as ferromagnetic gamma-iron oxides, cobalt surface-treated ferromagnetic iron oxides, cobalt-doped ferromagnetic iron oxides, cobalt containing $Fe_2O_3$, ferromagnetic magnetites, cobalt-containing ferromagnetic magnetites, ferromagnetic chromium dioxides, ferromagnetic metal powders, ferromagnetic iron powders, ferromagnetic alloy powders and the class of ferromagnetic ferrite powders including barium ferrites. Additionally, the above mentioned powder particles may be modified to provide lower light extinction and scattering coefficients by providing them with a shell, of at least the same volume as the magnetic core, of a low refractive index material that has its refractive index lower than the transparent polymeric material used to form the magnetizable layer. Typical shell materials may include amorphous silica, vitreous silica, glass, calcium fluoride, magnesium fluoride, lithium fluoride, polytetrafluoroethylene and fluorinated resins. Examples of the ferromagnetic alloy powders include those comprising at least 75% by weight of metals which comprise at least 80% by weight of at least one ferromagnetic metal alloy (such as Fe, Co, Ni, Fe—Co, Fe—Ni, Co—Ni, Co—Ni—Fe) and 20% or less of other components (such as Al, Si, S, Sc, Ti, V, Cr, Mn, Cu, Zn, Y, Mo, Rh, Re, Pd, Ag, Sn, B, Ba, Ta, W, Au, Hg, Pb, La, Ce, Pr, Nd, Te, and Bi). The ferromagnetic metals may contain a small amount of water, a hydroxide or an oxide. In addition, magnetic oxides with a thicker layer of lower refractive index oxide or other material having a lower optical scattering cross section as taught in U.S. Pat. No. 5,252,441 may also be used.

The dispersion in accordance with this invention contains magnetic particles which preferably are acicular or needle like magnetic particles. The average length of these particles along the major axis preferably is less than about 0.3, more preferably, less than about 0.2 micrometer. The particles preferably exhibit an axial ratio, that is, a length to diameter thickness ratio of up to about 5 or 6 to 1. Preferred particles have a specific surface area of at least 30 $m^2/g$, more preferably of at least 40 $m^2/g$. Typical acicular particles of this type include for example, particles of ferri and ferro iron oxides such as gamma-ferric oxide, complex oxides of iron and cobalt, various ferrites and metallic iron pigments. Alternatively, small tabular particles such as barium ferrites and the like can be employed. The particles can be doped with one or more ions of a polyvalent metal such as titanium, tin, cobalt, nickel, zinc, manganese, chromium, or the like as is known in the art.

A preferred particle consists of Co surface treated $\gamma$—$Fe_2O_3$ having a specific surface area of greater than 40 $m^2/g$. Particles of this type are commercially available and can be obtained from Toda Kogyo Corporation under the trade names CSF 4085V2, CSF 4565V, CSF 4585V and CND 865V and are available on a production scale from Pfizer Pigments Inc. under the trade designations RPX-4392, RPX-5003, RPX-5026 and RPX-5012. For good magnetic recording, the magnetic particles preferably exhibit coercive force above about 500 Oe and saturation magnetization above 70 emu/g.

In accordance with this invention, the transparent magnetic layer is prepared by initially forming a concentrated dispersion of the magnetic particles in water together with a dispersant as described in the above-mentioned U.S. Pat. Nos. 5,457,012, 5,531,913, and 5,520,954, preferably one having an HLB number of at least 8, more preferably an amphipathic water-dispersible or soluble polymeric dispersant, and milling the resulting mixture in a device such as a ball mill, a roll mill, a high speed impeller mill, media mill, an attritor, a sand mill or the like as described in U.S. Pat. No. 5,457,012. Milling is continued for a sufficient time to ensure that substantially no agglomerates of the magnetic particles remain.

The concentration of the magnetic particles in the dispersion is preferably about 5 to about 75%, more preferably about 10 to about 50% and most preferably about 15 to about 35%, the percentages being by weight based on the weight of the dispersion.

The length of time required depends on the particular milling device used. In general, milling should be continued from about 0.5 to about 8 hours, preferably from about 1 to about 4 hours.

The aqueous magnetic particle dispersion in accordance with this invention are employed in the fabrication of magnetically recordable layers or films and photographic elements that include a support, a light-sensitive layer and a transparent magnetic recording layer. Transparent magnetic recording layers or films would have widespread application in many environments wherein it would be desirable to include or encode information without interfering with the visual appearance of the object onto which the magnetic recording is made. For example, in a sheet of written text or a radiograph, information could be recorded in a magnetic recording transparent layer without interfering with the visual appearance of the text or the picture underlying the transparent magnetic recording layer.

The primary utility for transparent magnetic recording layers is in the photographic industry wherein a photographic film can be built onto a substrate that includes a transparent recording layer. The transparent magnetic recording layer is on a curl control layer on the side opposite the light-sensitive layers of the photographic film. This provides ease of encoding and readout while controlling the curl at the same time. Information can then be encoded into the magnetic layer during all steps of the preparation of the photographic product. This can include manufacturing data with regard to the various layers that are employed during the preparation of the film, information with regard to the properties of the various layers built onto the substrate and the like. Further, after the film is completed and is being used by the consumer, many and various applications can be envisioned wherein information is included in the magnetic layer that is helpful to the photographer, the developing laboratory and others engaged in this field of endeavor. For example, when a camera also has the capability of imparting data to a magnetic layer by having built in recording heads in the camera, information with regard to each frame of the film can be recorded, such as, the light conditions, the speed at which the frame is exposed, the F-Stop number and the like. Further, as described earlier information such as patient ID and other information, exposure conditions, and even interpretation of the diagnosis of the radiograph can also be encoded into the transparent magnetic layer in the case laser print films.

To apply a transparent magnetic layer optionally, a lubricating layer and a curl control layer simultaneously to a support, a coating composition is prepared, for example by dispersing the aqueous magnetic particle dispersion in an aqueous medium containing a hydrophilic binder. Examples of Hydrophilic binders which can be used are those described in *Research Disclosure No. 308119*, December 1989, and No. 18716 (page 651) November 1979. Illustrative hydrophilic binders include water-soluble polymers, gelatin, gelatin derivatives, cellulose esters, latex derivatives, casein, agar, sodium alginate, starch, polyvinyl alcohol, polyacrylic acid copolymers and maleic anhydride copolymers and mixtures thereof. The cellulose esters include hydroxyl propyl cellulose, carboxymethyl cellulose and hydroxyethyl cellulose. The latex polymers include vinyl chloride copolymers, vinylidene chloride copolymers, acrylic ester copolymers, vinyl acetate copolymers and butadiene copolymers. Among them, gelatin is most preferred.

Gelatin may be any of so-called alkali-treated (lime treated) gelatin which was immersed in an alkali bath, prior to extraction thereof, an acid-treated gelatin which was immersed in an alkali bath prior to extraction thereof, an acid-treated gelatin which was immersed in both baths and enzyme-treated gelatin. If necessary, gelatin can be used in combination with colloidal albumin, casein, a cellulose derivative (such as carboxymethyl or hydroxyethyl cellulose), agar, sodium alginate, a saccharide derivative (such as a starch derivative or dextrin), a synthetic hydrophilic colloid (such as polyvinyl alcohol, poly-N-vinylpyrolidone, a polyacrylic acid copolymer, polyacrylamide or a derivative or partial hydrolyzate thereof) or a gelatin derivative.

The curl control layer, coated opposite the light sensitive emulsion layer contains any of the above-mentioned hydrophilic colloids and may also contain filter dyes to prevent halation effects of light being passed through the front emulsion layer and support and being back scattered and/or reflected back to the emulsion layer. Such effects result in loss of image sharpness. The curl control layer is generally anywhere from 1–25 micrometers thick, in accordance with the formula $$\frac{T_C + T_M}{T_E} = X$$

where $0<X<10$, preferably $1 \leq X \leq 5$, most preferably $1.25 \leq X \leq 1.5$.

The above-described coating composition containing the dispersed magnetic particles, dispersant, film-forming hydrophilic binder and optionally a polyelectrolyte is coated simultaneously along with the curl control coating solution onto a suitable support such that the magnetic layer is on top of the curl control layer, either as is or along with additional or optional ingredients such as, crosslinking or hardening agents, coating aids, abrasive particles, lubricants, matting agents, antistatic agents, fillers and the like, before the coating operation. Optionally, as set forth above, a lubricating layer may be simultaneously coated over the magnetic layer. When a separate lubricating layer is employed in accordance with the above, Tm equals the thickness of the magnetic layer plus the thickness of the lubricating layer. The coating composition containing the magnetic particles can be chill-set and stored prior to use, then heated to coating temperature (40°–60° C.) just prior to coating. This cooling and re-heating does not adversely affect the quality of the coating or the magnetic properties of the resulting transparent magnetic recording layer.

The magnetic coating composition and the curl control compositions are applied simultaneously to a support which may contain additional layers for promoting adhesion, for controlling static charge and the like by any suitable coating device including slot die hoppers, slide hoppers, gravure coaters, reverse roll coaters and the like. The thickness of the magnetic layer preferably should be about 0.5 to about 10 μm, more preferably about 0.5 to about 5 μm and most preferably about 0.75 to about 3 μm so long as the above-described relationship is observed.

The magnetic layer can also be overcoated with conventional layers including antistats, protective overcoats, lubricants and the like either in a separate coating step or simultaneously as indicated above. Any suitable support may be employed in the practice of this invention, such as, cellulose derivatives including cellulose diacetate, cellulose triacetate, cellulose propionate, cellulose butyrate, cellulose acetatepropionate and the like; polyamides; polycarbonates; polyesters, particularly polyethylene terephthalate, poly-1, 4-cyclohexanedimethylene terephthalate, polyethylene 1, 2-diphenoxyethane-4,4'-dicarboxylate, polybutylene terephthalate and polyethylene naphthalate; polystyrene, polypropylene, polyethylene, polymethyl-pentene, polysulfone, polyethersulfone, polyarylates, polyether imides and the like. Supports for photographic elements are described in *Research Disclosure*, December 1989, Item 308,119 published by Kenneth Mason Publications, Ltd., Dudley Annex, 12a North Street, Emsworth, Hampshire PO10 7DQ, England, Section XVII, incorporated herein by reference.

Particularly preferred supports are polyethylene terephthalate, polyethylene naphthalate and the cellulose esters particularly cellulose triacetate.

Thickness of the supports used in the present invention is from 50 μm to 300 μm, preferably, 85 to 200 micrometers. In addition, various dyes may be formulated into the support or the magnetic layer to give neutral or the desired density.

Depending upon the nature of the support, suitable transparent tie or undercoat layers may be desired. Particularly with regard to polyester supports, primers are used in order to promote adhesion. Any suitable primers in accordance with those described in the following U.S. Pats. may be employed: 2,627,088; 3,501,301; 4,689,359; 4,363,872; and 4,098,952. Each of these is incorporated herein by reference in their entirety.

The magnetic recording layer of the present invention containing gelatin or other hydrophilic colloid, the curl control layer and any other layers on the same side containing gelatin, for example, is preferably hardened. The entire plurality of layers on the back side of the support may be hardened at once by introducing the hardener to layer closest to the support and allowing it to diffuse to the upper layers. Hardeners usable for hardening these layers include, for example, aldehyde compounds such as formaldehyde and glutaraldehyde; ketone compounds such as diacetyl and cyclopentanedione; compounds having reactive halogens such as bis(2-chloroethylurea), 2-hydroxy-4,6-dichloro-1,3,5-trizine and those described in U.S. Pat. Nos. 3,288,775 and 2,732,303 and British Patent Nos. 974,723 and 1,167,207; divinylsulfone, 5-acetyl-1,3-diacrylolhexahydro-1,3,5-triazine and reactive olefin-containing compounds such as divinylsulfone, 5-acetyl-1,2-diacryloyl-hexahydro-1,3,5-triazine, and the compounds such as divinylsulfone, 5-acetyl-1,3-diacryloyl-hexahydro-1,3,5-triazine, and the compounds disclosed in U.S. Pat. Nos. 3,635,718 and 3,232,763, and British Patent 994,869; N-hydroxymethylothalimide; N-methylol compounds such as N-hydroxymethylphthalimide and those described in U.S. Pat. Nos. 2,732,316 and 2,586,168; isocyanates described in U.S. Pat. Nos. 3,103,437; the aziridines disclosed in U.S. Pat. Nos. 3,017,280 and 2,983,611; acid derivatives described in U.S. Pat. Nos. 2,725,294 and 2,725,295; epoxy compounds described in U.S. Pat. No. 3,091,537; and halogenated carboxyaldehydes such as mucochloric acid. Examples of inorganic hardeners include chrome alum, zirconium sulfate and the carboxyl group activating hardeners described in Japanese Patent Publication for opposition purpose (herein after referred to as J.P. Kokoku) Nos. 56-12853 and 58-32699, Belgian Patent No. 825,726, J.P. Kokai Nos. 60-225148 and 51-126125, J.P. Kokoku No. 58-50699, J.P. Kokai No. 52-54427 and U.S. Pat. No. 3,321,313.

The hardener is generally used in an amount of from 0.01 to 30 weight percent, preferably from 0.05 to 20 weight percent, to the amount of dried gelatin.

As mentioned above, additional ingredients can be included in the coating composition of this invention. In certain embodiments of the invention, the coating composition (and thus, the magnetic layer) contains abrasive particles, reinforcing fillers or tin oxide.

Examples of abrasive and/or reinforcing filler particles include nonmagnetic inorganic powders with a Mohs scale hardness of not less than 6. Specific examples are metal oxides such as α-alumina, γ-alumina, chromium oxide (e.g., $Cr_2O_3$), iron oxide alpha (e.g., $Fe_2O_3$), silicon dioxide, alumino-silicate and titanium carbide; carbides such as silicon carbide and titanium carbide; nitrides such as, silicon nitride, titanium nitride and diamond in fine powder. Alpha alumina and silicon dioxide are the preferred abrasives in accordance with this invention. These can be pre-dispersed in water using the same dispersants as described in this invention and then incorporated into the coating composition.

Tin oxide particles in any form may be employed such as tin oxide per se or doped tin oxides, such as, antimony or indium doped tin oxide. The tin oxide may be used in either the conductive or non-conductive form; however, when in the conductive form, an additional advantage is gained in that the layer also acts as an antistat. Suitable conductive particles are disclosed in U.S. Pat. Nos. 4,495,276; 4,394,441; 4,431,764; 4,418,141 and 4,990,276 incorporated herein by reference. Useful tin oxide particles are commercially available from Keeling and Walker, Ltd. under the trade designation Stanostat CPM 375; DuPont Co. under the trade designation Zelec-ECP 3005XC and 3010SC and Mitsubishi Metals Corp. under the trade designation T-1. Preferred metal antimonates include those having rutile or rutile-related crystallographic structures as those disclosed in U.S. Pat. No. 5,368,995, the disclosure of which is incorporated by reference herein. These can be also be pre-dispersed in water using the same dispersants as described in this invention and then incorporated into the coating composition.

As noted, photographic elements in accordance with this invention comprise at least one photosensitive layer. Such photosensitive layers can be image-forming layers containing photographic silver halides such as silver chloride, silver bromide, silver bromoiodide, silver chlorobromide and the like. Both laser print and reversal silver halide elements are contemplated. For reversal films, the emulsion layers as taught in U.S. Pat. No. 5,236,817, especially Examples 16 and 21, are particularly suitable. Any of the known silver halide emulsion layers, such as those described in *Research Disclosure*, Vol. 176, December 1978 Item 17643 and *Research Disclosure* Vol. 225, January 1983 Item 22534, the disclosures of which are incorporated by reference in their entirety, are useful in preparing photographic elements in accordance with this invention. Generally, the photographic element is prepared by coating the support film on the side opposite the magnetic recording layer with one or more layers comprising a dispersion of silver halide crystals in an aqueous solution of gelatin and optionally one or more subbing layers, such as, for example, gelatin, etc. The coating process can be carried out on a continuously operating machine wherein a single layer or a plurality of layers are applied to the support. The layers can be coated simultaneously on the composite support film as described in U.S. Pat. No. 2,761,791 and U.S. Pat. No. 3,508,947. Additional useful coating and drying procedures are described in *Research Disclosure*, Vol. 176, December 1978, Item 17643. Suitable photosensitive image forming layers are those which provide color or black and white images.

In a specific embodiment of the photographic element as in the medical laser print film the emulsion layers have the requirement that the spectral sensitivity of the film match the spectral emission output of the laser printer used to make the exposure. Laser printers can use either lasers or light emitting diodes (LED's) as an exposure source. These can range from argon to helium/neon to infra red lasers that emit at a wide range of wavelengths. A common spectral range is 630–670 nm which covers the range of two red emitting laser printers, Kodak Ektascan XLP and Kodak Ektascan 2180. The former uses a helium/neon gas laser and the second uses a red emitting LED. By using a broad band spectral sensitizing dye one film can be used with both laser printers. It is of course recognized that different laser printers with different spectral emission outputs would require laser print films with different spectral sensitivity. The emulsions used to record the output of laser printers are typically fine grain, silver halide cubes, chemically and spectrally sensitized to correspond to the intensity and spectral emission of the exposure source being used.

As is taught in U.S. Pat. No. 3,782,947, whether an element is useful for both photographic and magnetic recording depends on both the size distribution and concentration of the magnetic particles and on the relationship between the granularities of the magnetic and photographic coatings. Generally, of course, the coarser the grain of the emulsion in the photographic element that contains the magnetic recording layer, the larger the mean size of the magnetic particles which can be tolerated. A magnetic particle concentration between about 10 and 1000 mg/m$^2$ when uniformly distributed across the desired area of the photographic element will be sufficiently photographically transparent provided that the maximum particle size is less than about 1 micrometer. Particle concentrations less than about 10 mg/m$^2$ tend to be insufficient for magnetic recording purposes and particle concentrations greater than about 1000 mg/m$^2$ tend to be too dense for photographic purposes. Particularly useful particle concentrations are in the range of 20–70 mg/m$^2$. Concentrations of about 20 mg/m$^2$ have been found to be particularly useful in reversal films and concentrations of about 40 mg/m$^2$ are particularly useful in negative films.

The photographic elements according to this invention can contain one or more conducting layers such as antistatic layers and/or anti-halation layers such as such as described in *Research Disclosure*, Vol. 176, December 1978, Item 17643 to prevent undesirable static discharges during manufacture, exposure and processing of the photographic element. Antistatic layers conventionally used in color films have been found to be satisfactory for use herewith. Any of the antistatic agents set forth in U.S. Pat. No. 5,147,768, which is incorporated herein by reference may be employed. Preferred antistats include metal oxides, for example, tin oxide, antimony doped tin oxide, vanadium pentoxide, and metal antimonates. In a preferred embodiment, the antistatic layer is applied to the support prior to the simultaneous application of the curl control layer, the magnetic layer and the lubricating layer. In another embodiment, the antistatic layer may be applied over the magnetic layer. A second antistatic layer may be applied to the opposite side of the support.

The photographic elements according to this invention can be provided with a protective or lubricating layer, such as a wax layer, in or over the transparent magnetic recording layer. Suitable lubricants include silicone oil, silicones having polar groups, fatty acid-modified silicones, fluorine-containing silicones, fluorine-containing alcohols, fluorine-containing esters, polyolefins, polyglycols alkyl phosphates and alkali metal salts thereof, alkyl sulfates and alkali metal salts thereof, polyphenyl ethers, fluorine-containing alkyl sulfates and alkali metal salts thereof, monobasic fatty acids having 10 to 40 carbon atoms (which may contain unsaturated bonds or may be branched) and metal salts thereof (such as Li, Na, K and Cu), monovalent, divalent, trivalent, tetravalent, pentavalent and hexavalent alcohols having 12 to 40 carbon atoms (which may contain unsaturated bonds or may be branched), alkoxy alcohols having 12 to 40 carbon atoms, mono-, di- and tri-esters of monobasic fatty acids having 10 to 40 carbon atoms (which may contain unsaturated bonds or may be branched) and one of monovalent, divalent, trivalent, tetravalent, pentavalent and hexavalent alcohols having 2 to 12 carbon atoms (which may contain unsaturated bonds or may be branched), fatty acid esters of monoalkyl ethers of alkylene oxide polymers, fatty acid amides having 8 to 40 carbon atoms and aliphatic amines having 8 to 40 carbon atoms.

Specific examples of these compounds (i.e., alcohols, acids or esters) include carnauba wax, lauric acid, myristic acid, palmitic acid, stearic acid, behenic acid, butyl stearate, oleic acid, linoleic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, pentaerythrityl tetrastearate, oleyl alcohol and lauryl alcohol. Preferably, the lubricating layer is applied simultaneously with the magnetic layer and the curl control layer where the composition of the lubricating layer includes gelatin, a viscosifier, a lubricant, and water.

A preferred photographic element for the laser print film according to this invention is described below. The aqueous magnetic coating compositions are prepared according to U.S. Pat. Nos. 5,457,012 and 5,531,913.

Protective Overcoat

This layer is coated in order to provide protection for the silver halide grains in the light sensitive emulsion layer. It can also be used to place matte beads, polymeric antistats, lubricants and other addenda to improve the physical characteristics of the film to prevent problems such as scratches and abrasions, tackiness, poor film transport, and static. The formulation for the overcoat is as follows:

| | |
|---|---|
| Gelatin | 0.443 g/m$^2$(41.2 mg/ft$^2$) |
| Matte beads (5–10 µm polymethylmethacrylate) | 0.0209 g/m$^2$(1.94 mg/ft$^2$) |
| Silicone lube | 0.014 g/m$^2$(1.3 mg/ft$^2$) |

Interlayer

This layer also provides protection for the silver halide grains in the light sensitive emulsion layer and also provides a place for addenda to improve physical properties. It also allows positioning depth wise in the coating package matte beads and/or silver matte such as described in U.S. Pat. No. 5,041,364 which discloses the use of large silver halide grains as a way to reduce film glossiness. Gelatin is coated at a coverage of 0.443 g/m$^2$(41.2 mg/ft$^2$).

Emulsion Layer

The emulsion layer contains the light sensitive silver halide microcrystal that results in the creation in the final viewable silver image. It also contains addenda to minimize photographic fog and prevent changes in sensitometry on keeping. The formulation is as follows:

| | |
|---|---|
| Gelatin | 2.47 g/m$^2$ (230 mg/ft$^2$) |
| AgX grain | 2.47 g/m$^2$ (230 mg/ft$^2$) |
| Antifoggants | 0.069 g/m$^2$ (6.4 mg/ft$^2$) |
| Resorcinol | 0.100 g/m$^2$ (9.3 mg/ft$^2$) |
| Sodium Disulfocatechol | 0.018 g/m$^2$ (1.7 mg/ft$^2$) |

Support

Medical radiographic films are generally coated on 7 mil polyethylene terephthalate support which can be either blue tinted or clear. This support must be sufficiently thick in order to provide good stiffness to be handled on a viewbox as well as transport well in film handling equipment, exposing devices and film processors.

Curl Control Layer

Coated opposite the light sensitive emulsion layer is a curl control layer which contains sufficient gelatin in order to prevent film curl as well as filter dyes to prevent halation effects of light being passed through the front emulsion layer and support and being back scattered and/or reflected back to the emulsion layer. Such effects result in loss of image sharpness. The formulation is as follows:

| | |
|---|---|
| Gelatin | 2.690 g/m$^2$ (250 mg/ft$^2$) |
| Absorbing dyes | 0.095 g/m$^2$ (8.8 mg/ft$^2$) |
| Bis-Vinylsulfonyl methyl ether hardener | 0.197 g/m$^2$ (18.3 mg/ft$^2$) |

Magnetics Layer and Protective Overcoat Layer

The following examples illustrate the preparation of transparent magnetic recording layers of high optical quality on a curl control layer in accordance with this invention.

| Example # | Magnetic Layer g/m² | Overcoat Layer g/m² |
|---|---|---|
| 1 | Gelatin 1.087 (101 mg/ft²)<br>Toda CSF-4085V2 0.059 (5.5 mg/ft²) (Co-$\gamma$-Fe$_2$O$_3$)<br>Sumitomo AKP-50 ($\gamma$-Al$_2$O$_3$)<br>Abrasive Particles 0.059 (5.5 mg/ft²)<br>TL502 0.0108 (1.0 mg/ft²) | Gelatin 0.0807 (7.5 mg/ft²)<br>Carnuba Wax 0.1883 (17.5 mg/ft²)<br>TL502** 0.005 (0.5 mg/ft²) |
| 2 | Gelatin 1.087 (101 mg/ft²)<br>Toda CSF-4085V2 0.059 (5.5 mg/ft²) (Co-$\gamma$-Fe$_2$O$_3$)<br>Sumitomo AKP-50 ($\gamma$-Al$_2$O$_3$)<br>Abrasive Particles 0.059 (5.5 mg/ft²)<br>TL502 0.0108 (1.0 mg/ft²) | Gelatin 0.152 (14.1 mg/ft²)<br>Carnuba Wax 0.108 (10 mg/ft²)<br>Antistat * 0.34 (32 mg/ft²)<br>TL502 0.003 (0.3 mg/ft²) |
| 3 | Gelatin 1.087 (101 mg/ft²)<br>Toda CSF-4085V2 0.059 (5.5 mg/ft²) (Co-$\gamma$-Fe$_2$O$_3$)<br>Sumitomo AKP-50 ($\gamma$-Al$_2$O$_3$)<br>Abrasive Particles 0.059 (5.5 mg/ft²)<br>TL502 0.0108 (1.0 mg/ft²) | Gelatin 0.0925 (8.6 mg/ft²)<br>Silicone Lube 0.108 (10 mg/ft²)<br>Antistat * 0.34 (32 mg/ft²)<br>TL502 0.003 (0.3 mg/ft²) |
| 4 | Gelatin 1.087 (101 mg/ft²)<br>Toda CSF-4085V2 0.059 (5.5 mg/ft²) (Co-$\gamma$-Fe$_2$O$_3$)<br>Sumitomo AKP-50 ($\gamma$-Al$_2$O$_3$)<br>Abrasive Particles 0.059 (5.5 mg/ft²)<br>TL502 0.0108 (1.0 mg/ft²) | Keltrol T*** 0.007 (0.63 mg/ft²)<br>Carnauba Wax 0.188 (17.5 mg/ft²) |
| 5 | Gelatin 0.78 (72.5 mg/ft²)<br>CSF-4085V2 0.0603 (5.6 mg/ft²)<br>Abrasive particles 0.0603 (5.6 mg/ft²)<br>AKP-50<br>Antistat * 0.570 (52.96 mg/ft²)<br>Silicone Lube 0.0194 (1.8 mg/ft²) | |
| 6 | Gelatin 1.409 (130.9 mg/ft²)<br>CSF 4085V2 0.059 (5.5 mg/ft²)<br>AKP-50 0.059 (5.5 mg/ft²)<br>TL502 0.0215 (2.0 mg/ft²) | |

*Antistat in accordance with U.S. Pat. No. 4,582,781 incorporated herein by reference.
**TL502-polystyrene sulfonate, sodium salt, National Starch Chemical Co.
***Keltrol T-Xanthan gum, Kelco

What is claimed is:

1. A photographic sheet element comprising: a film support; at least one light-sensitive layer having a hydrophilic binder on a first side of the support, the thickness of the at least one light-sensitive layer and other layers on the first side of the support being represented by $T_E$; on the opposite side of the support, a transparent magnetic recording layer comprising ferromagnetic particles in a hydrophilic colloid, the thickness of the transparent magnetic recording layer being represented by $T_M$ and being from 0.5 to 10 microns; intermediate, the transparent magnetic recording layer and the support, a hydrophilic colloid control layer, the thickness of the control layer being represented by $T_C$ and being from 1 to 25 microns; the relative thickness of the layers being represented by the formula:

$$\frac{T_C + T_M}{T_E} = X$$

where $0 < X < 10$.

2. The photographic sheet element of claim 1 wherein $1 \leq X \leq 5$.

3. The photographic sheet element of claim 1 wherein $1.25 \leq X \leq 1.5$.

4. The photographic sheet element of claim 1 wherein a lubricating layer is disposed on the magnetic layer.

5. The photographic sheet element of claim 4 wherein the lubricating layer comprises a lubricant and a viscosifier.

6. The element of claim 5 wherein the lubricating layer also contains gelatin.

7. The element of claim 1 being a laser print film.

8. The element of claim 1 being a color reversal film.

9. The element of claim 1 having an antistatic layer.

10. The element of claim 9 wherein the antistatic layer contains a metal oxide.

11. The element of claim 10 wherein the metal oxide is tin oxide, vanadium pentoxide or metal antimonates.

12. The element of claim 11 wherein the metal oxide is tin oxide.

13. The element of claim 12 wherein the tin oxide is antimony doped.

14. The element of claim 9 wherein the antistatic layer is positioned between the support and the control layer.

15. The element of claim 1 where a hardener is included in the control layer.

16. The element of claim 1, wherein the thickness of the transparent magnetic recording layer is from 0.5 to 5 micrometers.

17. The element of claim 1, wherein the thickness of the transparent magnetic recording layer is from 0.75 to 3 micrometers.

* * * * *